(12) United States Patent
Moe et al.

(10) Patent No.: US 10,962,632 B2
(45) Date of Patent: Mar. 30, 2021

(54) ELECTRONIC DEVICE AND METHOD FOR LOW POWER RF RANGING

(71) Applicant: Texas Instruments Incorporated, Dallas, TX (US)

(72) Inventors: Marius Moe, Fetsund (NO); Espen Wium, Oslo (NO); Tomas Motos, Hamar (NO); Hagen Clemens Graf, Oslo (NO)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/845,290

(22) Filed: Dec. 18, 2017

(65) Prior Publication Data

US 2019/0187262 A1 Jun. 20, 2019

(51) Int. Cl.
 *G01S 11/08* (2006.01)
 *G01S 13/38* (2006.01)
 *G01S 13/82* (2006.01)

(52) U.S. Cl.
 CPC .......... *G01S 11/08* (2013.01); *G01S 13/38* (2013.01); *G01S 13/825* (2013.01)

(58) Field of Classification Search
 CPC .................................... G01S 11/00–11/16
 See application file for complete search history.

(56) References Cited

U.S. PATENT DOCUMENTS

| 4,757,315 | A  | * | 7/1988 | Lichtenberg | G01S 13/753 342/125 |
| 6,859,761 | B2 | * | 2/2005 | Bensky | G01S 13/84 702/189 |
| 6,868,073 | B1 | * | 3/2005 | Carrender | G01S 13/84 340/572.1 |
| 2002/0094786 | A1 | * | 7/2002 | Berliner | G01S 13/84 455/67.16 |
| 2005/0206555 | A1 | * | 9/2005 | Bridgelall | G01S 13/878 342/127 |
| 2005/0237953 | A1 | * | 10/2005 | Carrender | G01S 13/84 370/278 |

(Continued)

FOREIGN PATENT DOCUMENTS

JP 2007292744 A * 11/2007

*Primary Examiner* — Gennadiy Tsvey
(74) *Attorney, Agent, or Firm* — Brian D. Graham; Charles A. Brill; Frank D. Cimino (57) ABSTRACT

Electronic devices and methods to provide wireless ranging are shown. A first electronic device includes a memory containing stored instructions that can perform a method for determining a distance between the first electronic device and a second electronic device. For each frequency in a selected set of frequencies, the method sets the transceiver to the respective frequency, sends a first tone having the frequency and a first phase to the second electronic device and receives a second tone having the first frequency and a second phase. For each selected frequency, the first electronic device determines the phase difference between the second tone and the controllable oscillator, receives a phase difference from the second electronic device, and calculates a phase delay for the frequency. The first electronic device calculates a phase delay difference for pairs of the frequencies; and determines the distance using these phase delay differences.

20 Claims, 5 Drawing Sheets

(56) References Cited

U.S. PATENT DOCUMENTS

| | | | |
|---|---|---|---|
| 2006/0107307 A1* | 5/2006 | Knox | H04L 63/0492 726/2 |
| 2007/0241904 A1* | 10/2007 | Ozaki | G01S 13/84 340/572.1 |
| 2010/0103020 A1* | 4/2010 | Wu | G01S 13/4454 342/28 |
| 2010/0109903 A1* | 5/2010 | Carrick | G01S 5/14 340/8.1 |
| 2011/0148710 A1* | 6/2011 | Smid | G01S 13/84 342/394 |
| 2012/0177088 A1* | 7/2012 | Bonin | G01S 5/0289 375/219 |
| 2014/0022059 A1* | 1/2014 | Horst | G06K 7/10009 340/10.3 |
| 2014/0207374 A1* | 7/2014 | Taylor, Jr. | G01C 21/16 701/470 |
| 2014/0248841 A1* | 9/2014 | Kluge | G01S 11/02 455/67.11 |
| 2015/0351067 A1* | 12/2015 | Taylor, Jr. | G01S 11/08 455/456.1 |
| 2017/0074979 A1* | 3/2017 | Nielsen | G01S 17/36 |
| 2018/0074600 A1* | 3/2018 | Park | G06F 3/0304 |
| 2018/0077589 A1* | 3/2018 | Jarvis | H04W 24/08 |
| 2018/0267154 A1* | 9/2018 | Ootaka | G01S 7/4912 |
| 2018/0267155 A1* | 9/2018 | Shimizu | G01S 13/36 |

* cited by examiner

ELECTRONIC DEVICE AND METHOD FOR LOW POWER RF RANGING

FIELD OF THE DISCLOSURE

Disclosed embodiments relate generally to the field of distance measurements. More particularly, and not by way of any limitation, the present disclosure is directed to an electronic device and method for low-power radio frequency (RF) ranging.

BACKGROUND

Multiple methods for measuring distance between devices and their environment or between two or more devices are used, e.g., Received-Signal-Strength-Indication (RSSI), Time-of-Flight (TOF), the use of wide bandwidth to achieve high precision TOF measurements and using phase difference information for synchronized devices that share, for example, a common clock source. However, achieving a desired accuracy in wireless devices, which can contain low complexity hardware and require low power consumption, remains a challenge.

SUMMARY

Embodiments of the disclosure provide electronic devices for providing and supporting wireless ranging, as well as methods operable on two or more wireless electronic devices that achieve a high level of accuracy with low power usage. A first electronic device transmits a tone, e.g., a continuous wave, having a selected frequency to a second electronic device, which then sends a return tone having the same frequency back to the first electronic device. Each electronic device measures the phase of the received tone relative to the device's own local oscillator. Since the local oscillator provides the frequency of the tone transmitted by each electronic device, the phase difference between the transmitted and received tones can be utilized to measure transmission delay even when the absolute value of the transmission phase is unknown.

Tones are sent and received multiple times at a number of different frequencies and at each tonal exchange, the phase difference between the received tone and the local oscillator is measured. The size of the step(s) between the selected frequencies is chosen to increase either accuracy or unambiguous range. By varying the steps between selected frequencies, both accuracy and sufficient unambiguous range can be achieved. A combination of individual measurements made utilizing the disclosed method provides the same accuracy as a single wideband measurement.

In one aspect, an embodiment of a first electronic device for providing wireless ranging is disclosed. The first electronic device includes a processing unit; a software-controlled transceiver coupled to a connector for attachment to an antenna; a controllable oscillator; a phase estimator; a memory, wherein the processing unit, the software-controlled transceiver, the controllable oscillator, the phase estimator and the memory are coupled to each other; and instructions stored in the memory that when executed by the processing unit perform a method for determining a distance between the first electronic device and a second electronic device, the method comprising: for each frequency in a selected set of frequencies, setting the software-controlled transceiver to the respective frequency, sending a first tone having the respective frequency and a first phase to the second electronic device, receiving from the second wireless device a second tone having the first frequency and a second phase and measuring the phase difference between the second tone and the controllable oscillator, receiving a measured phase difference from the second electronic device, and calculating a phase delay for the selected frequency; calculating a phase delay difference for pairs of the selected frequencies; and determining a distance between the first electronic device and the second electronic device using the phase delay differences for the selected frequencies.

In another aspect, an embodiment of a non-transitory computer readable medium having a sequence of program instructions which, when executed by a processing unit in a first electronic device comprising an oscillator, a transceiver and a phase estimator, perform a method for providing distance measurements is disclosed. The method includes for each frequency in a selected set of frequencies, setting the software-controlled transceiver to the respective frequency, sending a first tone having the respective frequency and a first phase to the second electronic device, receiving from the second wireless device a second tone having the first frequency and a second phase and measuring the phase difference between the second tone and the controllable oscillator, receiving a measured phase difference from the second electronic device, and calculating a phase delay for the selected frequency; calculating a phase delay difference for pairs of the selected frequencies; and determining a distance between the first electronic device and the second electronic device using the phase delay differences for the selected frequencies.

In yet another aspect, an embodiment of first electronic device for supporting wireless ranging is disclosed. The first electronic device includes a processing unit; a software-controlled transceiver coupled to a connector for attachment to an antenna; a controllable oscillator; a phase estimator; a memory, wherein the processing unit, the software-controlled transceiver, the controllable oscillator, the phase estimator and the memory are coupled to each other; and instructions stored in the memory that when executed by the processing unit perform a method for supporting determination of a distance between the first electronic device and a second electronic device, the method comprising: receiving at the first wireless device a first tone having a first frequency and a first phase from a second electronic device; if the controllable oscillator is not operating at the first frequency, setting the controllable oscillator to match the first frequency, the controllable oscillator having a second phase; while preserving the second phase, switching to transmit mode and sending a second tone having the first frequency and the second phase; measuring a phase difference between the first tone and the controllable oscillator; and sending the phase difference to the second electronic device.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As used herein, phase offset may refer to a property of an oscillator and of the signal produced by the oscillator that defines the difference between the phase of the signal and a reference signal; phase delay may refer to the difference between the phase of a transmitted signal and a received reflection of the signal or the equivalent of such a reflection; phase difference may refer to the difference in phase between two signals having the same frequency; and tonal exchange may refer to a complete cycle of a first device sending a first signal to a second device and receiving a second signal from the second device in return.

Distance has been measured for many years by measuring the time delay of an echo, e.g., utilizing a transmitted pulse that is as narrow and powerful as possible. Over time, many systems evolved to utilize a frequency response, e.g., a series of pulses, rather than a single impulse response, as measuring the frequency response is less resource intensive, although more time consuming. The frequency spectrum is sampled by letting the RF transceiver step through the sample frequencies one at a time, measuring the amplitude and phase response while transmitting a continuous wave (CW) signal. The frequency step size and the number of frequencies together determine the resolution and unambiguous range of the system.

The maximum unambiguous distance, $d_{unambiguous}$, for a system can be determined by choosing the size of the frequency step as follows:

$$d_{unambiguous} = \frac{c2\pi}{2(\omega_2 - \omega_1)} = \frac{c2\pi}{4\pi(f_2 - f_1)} = \frac{c}{2(f_2 - f_1)} \quad \text{Equation 1}$$

where c is the speed of light, $\omega_1$ and $\omega_2$ are respective angular frequencies and $f_1$ and $f_2$ are respective frequencies of two adjacent frequencies. According to this formula, utilizing frequencies spaced 2 MHz apart provides an unambiguous distance or range of 75 meters, while utilizing frequencies spaced 63 MHz apart provides an unambiguous range of 2.38 meters.

It is generally impractical for a low-power radio to utilize an echo for very large distances. If a passive target is replaced with an active transponder, transmit power can be greatly reduced, overall power consumption is reduced and hardware that can send and receive at the same time becomes unnecessary. However, the return signal is no longer a passive reflection with a known and simple relation to the outgoing signal, but instead can have the same frequency, but a completely random phase in relationship to the signal sent. The disclosed embodiments solve this issue by measuring the phase difference between a received tone and a local oscillator at both ends, with the target electronic device sending a determined result to the originating electronic device for inclusion in appropriate calculations.

In a low power RF transceiver, local oscillator sources $LO_A$ and $LO_B$ assume a random phase every time they are locked to a new frequency, but will retain coherence over long periods of time if kept in lock. The two electronic devices will also have a small frequency offset due to crystal frequency differences, e.g., 10's of ppm, but this offset will be constant and can be measured at the start of the frequency stepping. The error sources to be taken into account are thus phase offset, which is measured for each frequency, and frequency offset, which is measured once.

The measurement sequence can be summarized as follows, with this summary assuming a single exchange between the first and second electronic devices for each frequency:

a) Measure the frequency offset (if needed);
b) The first electronic device transmits a first frequency $f_1$, the second electronic device sets the local oscillator to $f_1$ and measures the phase difference between the incoming tone and the second device's local oscillator;
c) The second electronic device transmits $f_1$ and the first electronic device measures the phase difference between the incoming tone and the first device's local oscillator;
d) Repeat b) and c) for frequencies $f_2$ through $f_n$, where the number n of frequencies can be in a range, e.g., between four and ten;
e) The second electronic device transmits the measured phase difference for each frequency over a secure connection;
f) The first electronic device calculates the phase delay for each frequency;

g) The first electronic device calculates the phase delay difference between frequency pairs, discarding outliers.

h) The first electronic device calculates distance as:

$$d = \frac{c(\text{phase delay difference})}{4\pi(\text{frequency step size})}$$

Figure 7:
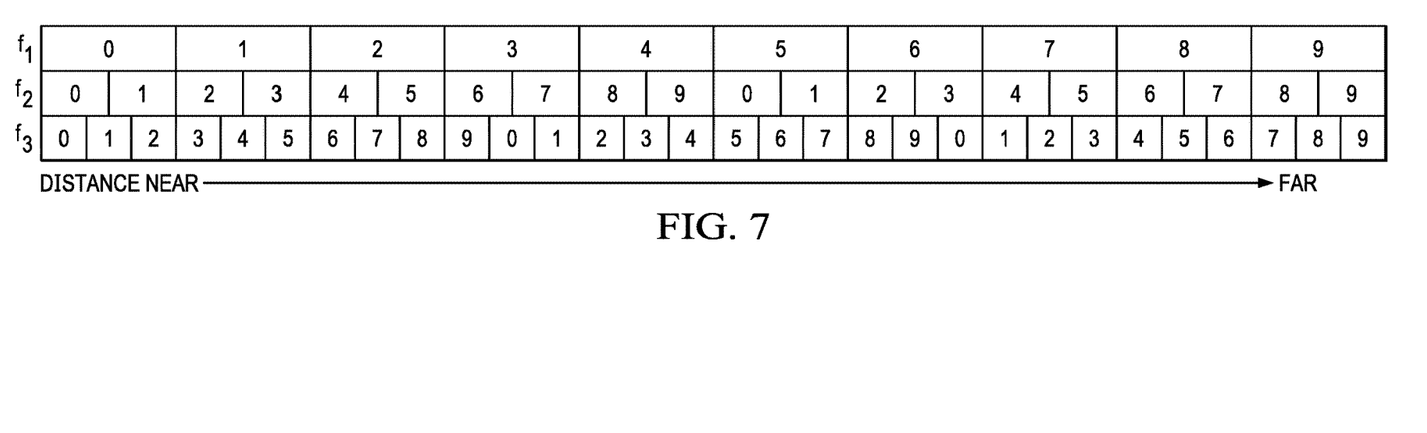
FIG. 7 illustrates the concept of how different frequencies can provide a different unambiguous range and accuracy.

FIG. 7 provides a comparison of how different frequencies can provide different unambiguous ranges and different levels of accuracy. In this example, each frequency is able to accurately distinguish an unambiguous range into ten different slots, which are labeled from 0 to 9. Frequency $f_1$ covers the entire range of the distance shown and can determine the distance to be within one of the ten slots, but these slots can each cover a large distance. Frequency $f_2$ has an unambiguous range that is half that of frequency $f_1$, but provides greater accuracy within its unambiguous range, e.g., within the first set of 0-9. Frequency $f_3$ has an unambiguous range that is one third that of frequency $f_1$, but provides even greater accuracy within its unambiguous range. If, for example, frequency $f_3$ provides a phase measurement of 4, there are three separate locations in the range shown that have a value of 4. However, by knowing that frequency $f_1$ provides a measurement of 4 and frequency $f_2$ provides a measurement of 9, it can be possible to determine the distance with some accuracy. This is a simplified explanation, but provides an idea of how the measurements can be combined to provide accurate distance measurements.

In at least some embodiments, the approximate distance to the target electronic device can be roughly determined before execution of the disclosed distance measurements, e.g., by a prior direct TOF measurement. In these embodiments, the originating electronic device can select the optimal frequency step size and reduce the number of measurements. For example, if the distance is known to be less than 18 meters, the originating electronic device can select 4×2 MHz or 8 MHz as the starting step size. Using other sensing techniques such as RSSI and direct TOF can also help avoid wasting energy and access time doing sensitive phase measurements when the signal to noise ratio is poor. Using this overview of the process, we now turn to specific embodiments of the disclosed electronic device and methods.

Figure 1:
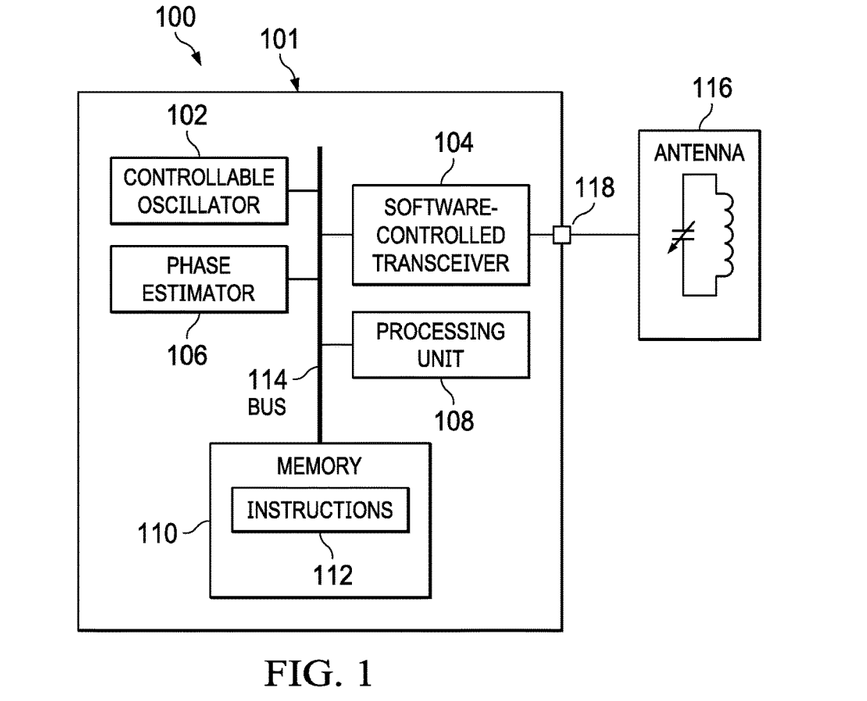
FIG. 1 depicts an example of an electronic device for providing wireless ranging according to an embodiment of the disclosure.

FIG. 1 depicts a schematic diagram of an example electronic device 100 for providing wireless ranging according to an embodiment of the disclosure. Electronic device 100 includes an integrated circuit (IC) chip 101 and an antenna 116. IC chip 101 includes a controllable oscillator 102, which can be, for example, a digitally-controlled oscillator, and a software-controlled transceiver 104. Connector 118, which in one embodiment can be a pin on the IC chip, provides a coupling point for attachment of IC chip 101 to an antenna 116. IC chip 101 also includes phase estimator 106, processing unit 108 and memory 110. Controllable oscillator 102, software-controlled transceiver 104, phase estimator 106, processing unit 108 and memory 110 are coupled to each other through bus 114. Memory 110 contains a set of instructions 112 that when executed by the processing unit 108, cause the electronic device 100 to perform the method of determining a distance between two devices as disclosed herein. Although phase estimator 106 is shown here as a hardware component, the phase estimator can alternatively be implemented as a software routine that is stored in memory on electronic device 100 and executed by processing unit 108. For the purposes of this application, references to a phase estimator include both hardware and software versions. One important capability in electronic device 100 is the ability to switch from transmission to reception or from reception to transmission without losing phase information for controllable oscillator 102.

Figure 2:
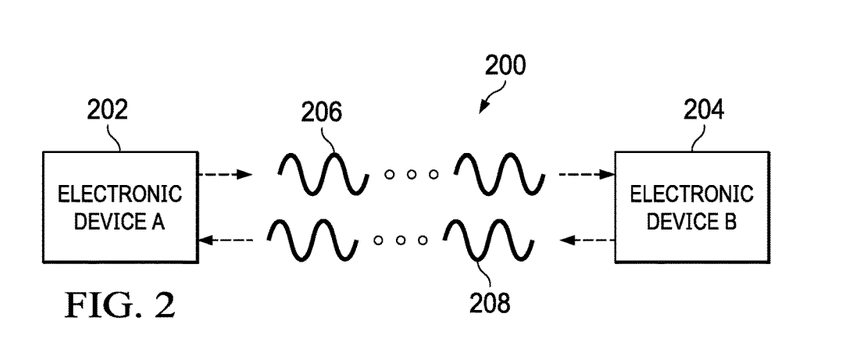
FIG. 2 depicts a system that can utilize the disclosed electronic device to provide ranging according to an embodiment of the disclosure.

Operation of electronic device 100 will be explained with reference not only to FIG. 1, but also to FIG. 2, which depicts a system 200 that contains two wireless electronic devices: electronic device A 202 and electronic device B 204. In this example, electronic device A 202 initiates the distance measurement(s) and electronic device B 204 provides a response. Each of electronic devices A and B can include IC chip 101 or a similar IC chip. As noted previously, electronic device A 202 will transmit the signal at multiple frequencies in order to estimate the distance using only a low-power signal; the steps between the frequencies can be determined by the distance to electronic device B 204.

If the distance to the electronic device B 204 is not known, electronic device A 202 may initially start with a series of small frequency steps to determine whether electronic device B 204 is nearby. If the small frequency steps do not provide the necessary information, electronic device A 202 can increase the step size between selected frequencies, decreasing the unambiguous range but increasing the accuracy. In at least some embodiments, a rough estimate of the distance to electronic device B 204 is known using less accurate methods of ranging, such as TOF and RSSI. In this latter situation, a selection of frequencies having appropriate steps there between can be made prior to beginning the disclosed method. The following discussion refers to a first and a second frequency, which can be predetermined based on whether or not the rough distance is known. Subsequent frequencies can be predetermined or selected as necessary to provide the desired results.

Under control of a respective processing unit, such as processing unit 108, electronic device A 202 operates to send a tone 206 that has a first frequency to electronic device B 204. Electronic device B 204 receives tone 206 and adjusts the frequency at electronic device B 204 to the first frequency. The second electronic device will also make note of a difference between the phase of tone 206 and the phase of the oscillator at electronic device B 204. This difference is provided back to electronic device A 202, but the timing of when this difference is provided can be variable depending on the implementation.

Electronic device B 204 then sends a second tone 208 that has the first frequency towards electronic device A 202. It can be seen in FIG. 2 that tones 206, 208 share the same frequency, but have different phases. Electronic device A 202 then determines the difference between tone 208 and the phase of the oscillator at electronic device A 202. Depending on the accuracy desired and the level of noise that is present in tones 206, 208, a tone having the first frequency can be sent and returned a number of times in order to provide an average value. In an ideal environment having no noise, a single transmission and response can suffice to provide the desired information, although real world situations rarely afford an ideal environment. In one test in a noisy environment, the first frequency was sent and returned a hundred times in order to provide average values of the measured phase differences and the calculated phase delay.

Electronic device A 202 then shifts to a second frequency and repeats the entire process for the second frequency. That is, electronic device A 202 sends a tone 206 having the second frequency to electronic device B 204. Electronic device B 204 sets a respective oscillator to the second frequency and sends a return tone 208 at the second frequency. Electronic device B 204 also notes the phase difference between tone 206 and the oscillator of electronic device B 204. In one embodiment, the phase difference is sent to electronic device A 202 at the same time that the return tone is sent. In one embodiment, electronic device B 204 maintains a log of measured phase differences for each tonal exchange and sends the collected log to electronic device A 202 at a later time. In either case, for each tonal exchange made, electronic device A 202 measures the phase difference between tone 208 and the oscillator at electronic device A and adds the phase difference measured at electronic device A 202 to the phase difference measured at electronic device B 204 to determine a phase delay for the tonal exchange.

Electronic device A 202 will continue to step through a selected set of frequencies, performing the disclosed sending and receiving of tones at each of the selected frequencies while collecting the phase differences and calculating a phase delay for each tonal exchange. The calculated phase delays for each frequency can be found by averaging all of the phase delays for the frequency. Differences between the phase delays calculated for various frequencies can be utilized to determine the distance between the two electronic devices.

Uses for the disclosed ranging capabilities can be numerous. Electronic devices 202, 204 can be utilized to provide distance measurements for keyless car entry or automatic opening of a garage door when a resident car approaches. The disclosed ranging capabilities can also be utilized in a factory or warehouse situation to provide tracking of assets, e.g., for automatic location determinations or theft control. Electronic devices 202, 204 can be included in many other applications being developed as part of the internet-of-things. Although not specifically mentioned previously, communications between electronic device 202 and electronic device 204 can be encrypted to provide increased security for the process.

Figure 3A:
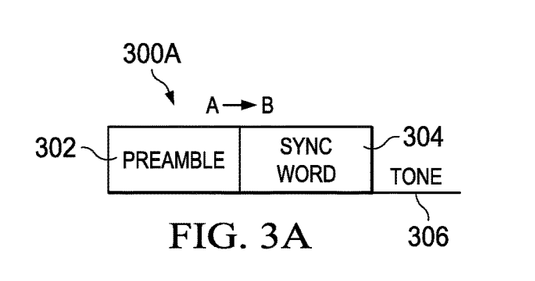
FIGS. 3A and 3B depicts information shared between electronic devices for synchronization and ranging according to an embodiment of the disclosure.
Figure 3B:
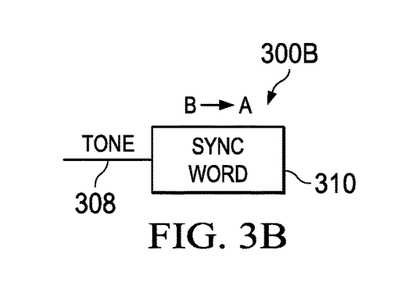
Figure 4A:
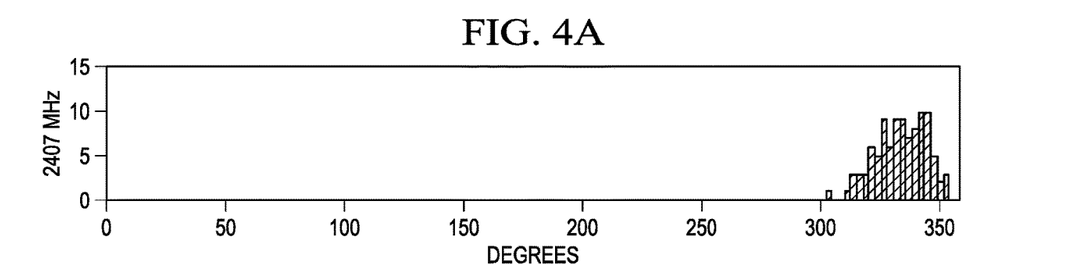
FIGS. 4A-4D depict histograms of the spread of calculated phase delays determined at four separate frequency values according to an embodiment of the disclosure.
Figure 4B:
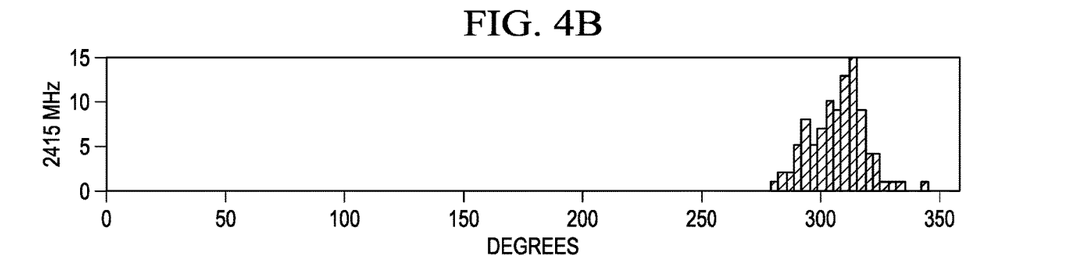
Figure 4C:
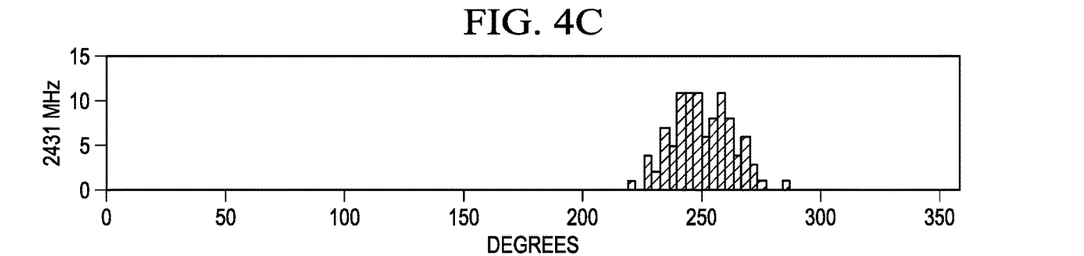
Figure 4D:
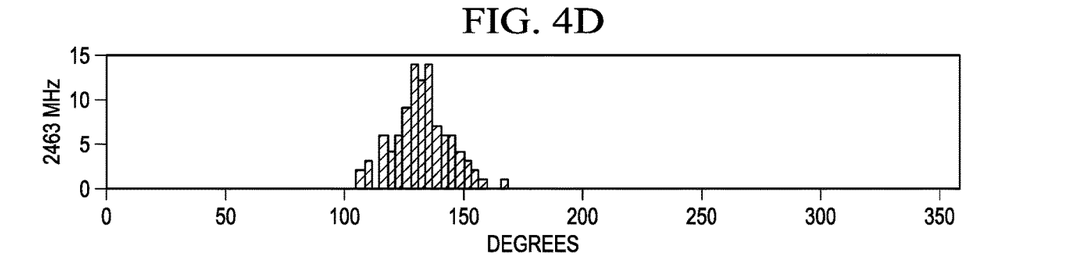

FIGS. 3A and 3B depict one example of a synchronization sequence utilized by electronic devices 202, 204 that can also provide the disclosed exchange of tones. In the first portion of the synchronization sequence, electronic device A sends communication 300A towards electronic device B. In this embodiment, communication 300A contains a preamble 302 and a synchronization word 304; this portion of communication 300A is commonly utilized in radio frequency (RF) protocols to identify an entity or entities to which the communication is directed and to provide coarse timing alignment. Electronic device B recognizes that a tone 306 will immediately follow. In the second portion of the synchronization sequence, electronic device B sends communication 300B towards electronic device A. In this embodiment, communication 300B first sends tone 308, which is sent at the same frequency as tone 306, but generally has a different phase. Synchronization word 310, which is again a recognized part of a normal synchronization process, is sent to indicate the end of communication 300B. Although not specifically shown in this embodiment, communication 300B can also contain the phase difference measured by electronic device B if desired. It will be understood that the exact order and/or contents of elements in communications 300A, 300B can vary from that shown in FIGS. 3A, 3B without deviating from the disclosed method.

FIGS. 4A-4D depict histograms that reflect the propagation phase delay measured in degrees of phase angle during testing performed using the disclosed method. The test in which this data was collected was performed in a noisy environment, necessitating multiple exchanges of tones, which in this instance was set at 100 exchanges per frequency to provide better averaging. In one embodiment, tonal exchanges were performed on seven channels or frequencies, although only four are shown in this example. The histogram in FIG. 4A reflects the results at 2407 MHz, while FIG. 4B reflects the results at 2415 MHz, FIG. 4C reflects the results at 2431 MHz, and FIG. 4D reflects the results at 2436 MHz. The resolution can be improved by utilizing multiple frequencies and different sizes of frequency steps. The distance associated with the histograms shown was 150 cm.

Figure 5:
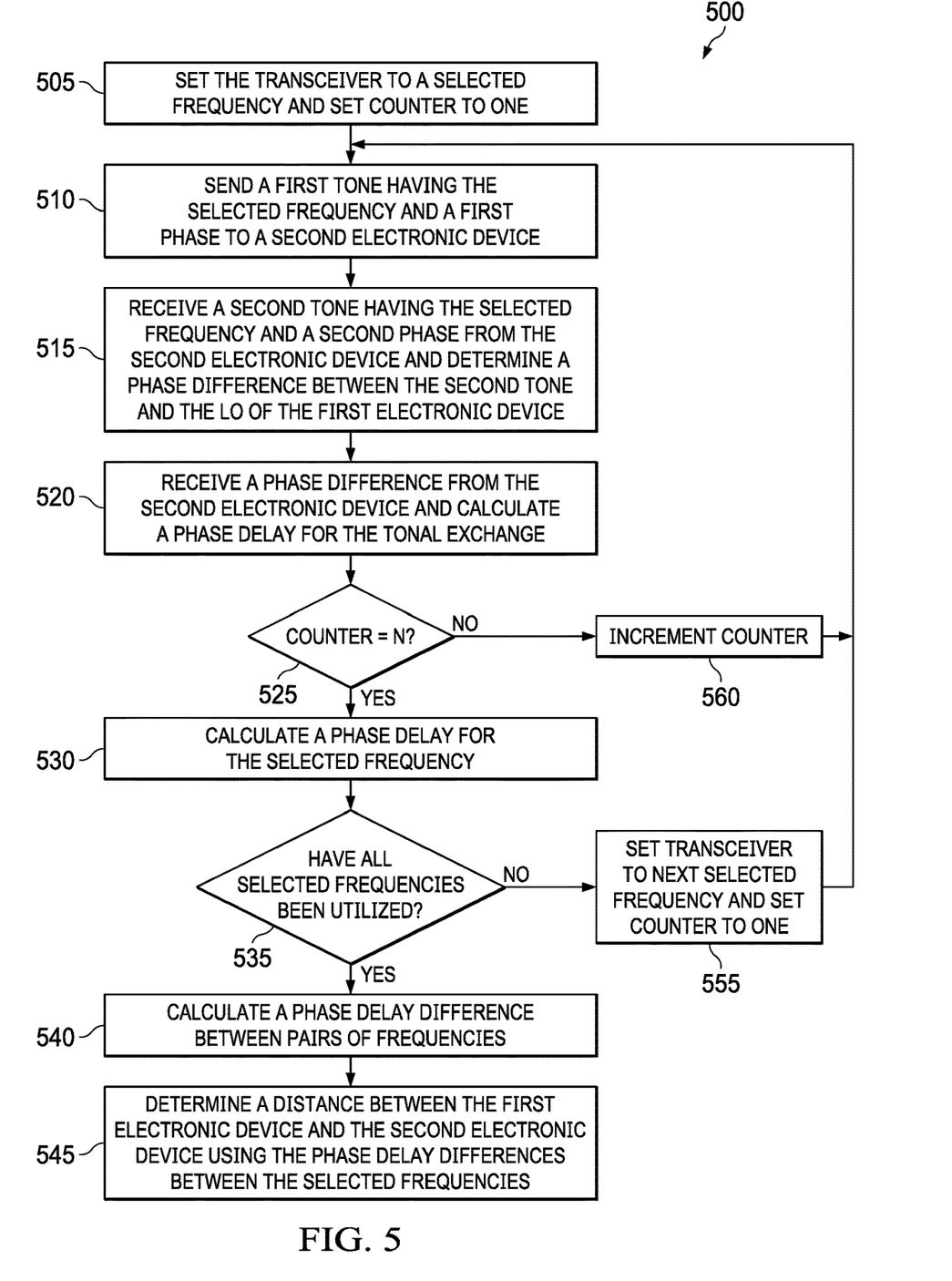
FIG. 5 depicts a method for providing wireless ranging according to an embodiment of the disclosure.

FIG. 5 depicts a method 500 for providing wireless ranging according to an embodiment of the disclosure and is performed at the first electronic device, which is the initiator of the measurement methodology. The example shown in method 500 assumes that N iterations of sending and receiving a tone are performed for each selected frequency, where N is an integer. It will be understood that this example is for illustration only and is not a necessary part of the disclosed method nor a limitation thereon. As previously mentioned, a single measurement of the phase delay may be all that is required in a very low noise environment, while other embodiments can have a variable number of iterations depending on the noise on each individual frequency. Other variations will occur to one of ordinary skill in the art.

Method 500 begins with setting 505 the transceiver in a first electronic device to a selected frequency and setting a counter to one. In one embodiment, the selected frequency is chosen with reference to a known rough distance between the first electronic device and a second electronic device that serves as the target device. In one embodiment, the selected frequency is chosen as part of a predetermined pattern of frequencies that is utilized to determine a rough distance from the second electronic device. Other selection patterns can also be utilized. The first electronic device then sends 510 a first tone to the second electronic device; the first tone has the selected frequency and a first phase, which provides a starting point from which a phase delay can be determined.

In response, the first electronic device receives 515 a second tone that has the selected frequency and a second phase from the second electronic device and determines a phase difference between the second tone and a local oscillator at the first electronic device. Again, one skilled in the art will recognize that the second phase, as received at the first electronic device, is determined by both the local oscillator on the second electronic device and the distance between the two electronic devices. The first electronic device will also receive 520 a phase difference measured at the second electronic device, which is similarly affected by the distance between the two electronic devices. For each tonal exchange, the phase difference measured at the first electronic device is added to the phase difference measured at the second electronic to determine a phase delay. Since in the embodiment shown, the first electronic device is programmed to repeat the sending of the first tone and receiving the second tone N times, the method determines 525 whether the counter is equal to N. If the counter has not reached N, the counter is incremented 560 and the method returns to element 510. If all of the tonal exchanges for a single frequency have been made, a phase delay for the frequency can be calculated 530 from all of the phase delays collected for the frequency, e.g., by calculating a phase delay for each tonal exchange and averaging the phase delay for all of the tonal exchanges for the frequency. Then, a determination is made 535 whether all selected frequencies have been utilized. If additional frequencies remain, the method proceeds to set 555 the transceiver to a next selected frequency, again sets the counter to one and returns to element 510.

If all frequencies have been utilized, the first electronic device then calculates 540 a phase delay difference between selected pairs of frequencies (e.g., a difference between the phase delays determined, respectively, for two different frequencies). The distance between the first electronic device and the second electronic device is then determined 545 using the phase delay differences between the selected frequencies. In one embodiment in which five frequencies $f_1$, $f_2$, $f_3$, $f_4$, $f_5$ are initially utilized, phase delay differences are calculated between $f_1$ and each of the remaining frequencies to determine the distance. Each of the phase delay differences may be associated with a corresponding frequency difference or frequency separation, ΔF, which may be indicative of an amount of separation between the two frequencies used to calculate the phase delay difference. In some examples, to determine the distance between the devices 202, 204, first electronic device 202 may select a smallest frequency separation, and determine a first distance range associated with the selected frequency separation. For example, electronic device 202 may use an equation shown below as Equation 10 to determine the distance range. Electronic device 202 may then select a higher frequency separation value, and determine a second distance range associated with the selected frequency value such that the second distance range overlaps either partially or fully with the first distance range and/or is included in the first distance range. Electronic device 202 may continue to select higher frequency separation values, and determine overlapping frequency ranges in a similar manner to further increase the precision/accuracy of the distance measurement. The final distance range may correspond to the measured distance. In further examples, electronic device 202 may determine candidate distance ranges associated with each of the phase delay differences, and determine a final distance range that overlaps at least one candidate distance range for each of the phase delay differences. The final distance range may correspond to the measured distance.

Figure 5A:
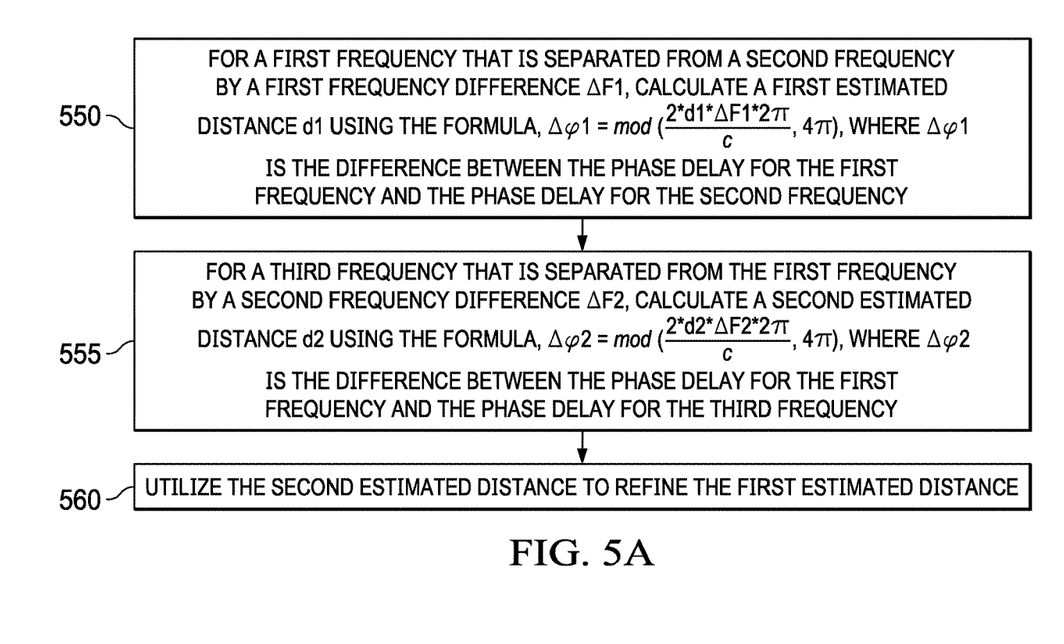
FIG. 5A depicts the elements of determining the distance between two electronic devices according to an embodiment of the disclosure.

In one embodiment, the elements of determining the distance between the first electronic device and the second electronic device is shown in FIG. 5A and includes, for a first frequency that is separated from a second frequency by a first frequency difference ΔF1, calculating 550 a first estimated distance d1 using the formula given below as Equation 10. The method continues with a third frequency that is separated from the first frequency by a second frequency difference ΔF2, calculating 555 a second estimated distance d2 using the formula of Equation 10. The method then utilizes 560 the second estimated distance to refine the first estimated distance. This process can also be continued for additional frequencies having larger frequency differences from the first frequency to refine the estimated distance as much as desired. Further, although the above example compares two related pairs of frequencies, e.g., a first frequency compared to both a second frequency and a third frequency, the pairs can be unrelated, e.g., a first pair compares a first frequency to a second frequency and a second pair compares a third frequency to a fourth frequency. The utilization of frequency pairs separated by different frequency differences provides benefits in that small frequency differences bring a high range but low accuracy, while a large frequency difference brings a low range and high accuracy. Other comparisons than those shown are of course possible, but it is not necessary to determine the difference between every pair of frequencies. The selection of frequencies can be chosen in such a manner that outliers—phase delay differences that are suspicious—can be more easily detected and discarded.

Figure 6:
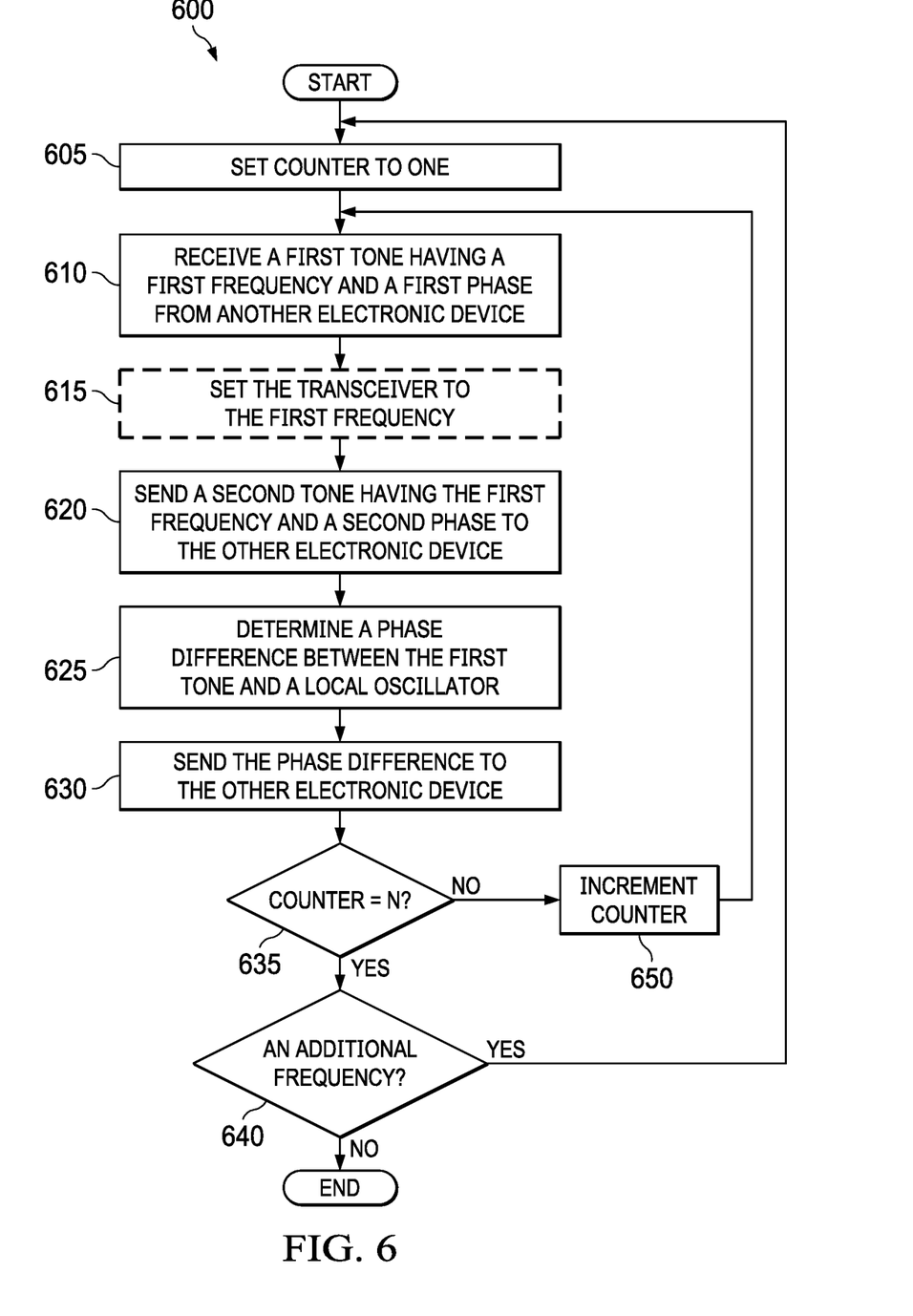
FIG. 6 depicts a method for supporting wireless ranging according to an embodiment of the disclosure.

FIG. 6 depicts a method 600 for supporting wireless ranging according to an embodiment of the disclosure and is performed at the electronic device that receives the initial transmission of a tone. Method 600 begins with setting 605 a counter to one. The first electronic device receives 610 a first tone from another electronic device; the tone has a first frequency and a first phase. If this is a new frequency, the method sets 615 the transceiver to the first frequency, hence this element is shown as optional by the dotted lines and is only performed when the frequency changes. The electronic device then sends 620 a second tone having the first frequency and a second phase to the other electronic device and also determines 625 a phase difference between the first tone and the local oscillator. The phase difference is sent 630 to the other electronic device, either at this time or else as a log of the determined phase differences sent at a later time. Since this example expects to receive N repetitions of the first tone, the method determines 635 whether the counter is equal to N. If not, the method increments 650 the counter and returns to element 610 to receive a further tone. If the counter is equal to N, the method determines 640 whether any additional frequencies are being received. If additional frequencies are being received, the method returns to element 605 and continues; otherwise the method is completed.

The following discussion provides the mathematical basis for the disclosed embodiments. An oscillator, such as controllable oscillator 102 generates an RF frequency that has a static frequency, F_RF, and a time varying phase which can be written as $$\varphi_a(t) = 2\pi * F_{RF\_A} * t + \varphi_{offset\_a}. \qquad \text{Equation 2}$$

The phase offset, $\varphi_{offset\_a}$ is a constant offset due to the fact that when an oscillator is started, there can be an unknown initial phase offset. This offset may change from start-up to start-up, but is constant while the oscillator is running. The transmitted signal is then a sine wave with amplitude:

$$RF_a = \text{sine}(\varphi_a) \qquad \text{Equation 3}$$

The signal, when observed from a distance becomes:

$$RF_{observed} = sine\left(\varphi_a + \frac{d * F_{RF\_A} * 2\pi}{c}\right) \qquad \text{Equation 4}$$

where c is the speed of light in the medium, e.g., air. The additional term is due to the propagation delay from the sender to the observer.

As described in the disclosed embodiments, electronic device B sends a tone to electronic device A, so that a reflected tone is not necessary. Due to the distance d between electronic device B and electronic device A, electronic device B will observe the phase of the incoming sine wave from device A as:

$$\varphi_{measured_b} = \qquad \text{Equation 5}$$
$$\text{mod}\left(\varphi_a + \frac{d * F_{RF_A} * 2\pi}{c} - \varphi_b, 2\pi\right) = \text{mod}\left(2\pi * F_{RF_A} * t + \varphi_{offset_a} - 2\pi * F_{RF_b} * t - \varphi_{offset_b} + \frac{d * F_{RF_A} * 2\pi}{c}, 2\pi\right)$$

where the n*2π term comes from the periodic nature of the sine wave.

When electronic device B tunes its local oscillator to the same frequency as the incoming tone from electronic device A, this means that $$F_{RF_A} = F_{RF_B} = F_{RF}$$ Equation 6 which simplifies Equation 5 to:

$$\varphi_{measured_b} = \mod\left(\varphi_{offset_a} - \varphi_{offset_b} + \frac{d * F_{RF} * 2\pi}{c}, 2\pi\right)$$ Equation 7

When electronic device B sends a second tone to electronic device A, electronic device A similarly measures the difference between the phase of this second tone compared to the local oscillator at electronic device A:

$$\varphi_{measured\_a} = \mod\left(\varphi_{offset_b} - \varphi_{offset_a} + \frac{d * F_{RF_A} * 2\pi}{c}, 2\pi\right)$$ Equation 8

As noted previously, electronic device B transmits its measured phase difference to electronic device A. By taking the sum of the two measurements electronic device A calculates a phase delay measurement for the roundtrip:

$$\varphi_{roundtrip} = \varphi_{measured\_a} + \varphi_{measured\_b} = \mod\left(\frac{2 * d * F_{RF} * 2\pi}{c}, 4\pi\right)$$ Equation 9

Since electronic device A is able to calculate the phase delay, $\varphi_{roundtrip}$, electronic device A can extract the unknown distance d from the equation. The number of whole periods of the sine wave that the signal has travelled is unknown, as the process only measures the fractional period, giving rise to ambiguity. Only if the distance is less than half a wavelength can an unambiguous answer be obtained. For an example utilizing 2.4 GHz communication, the wavelength is 12.5 cm, limiting the range to an impractical 6.25 cm. It is desirable to have an unambiguous range of more than the range of the radio communication, so that an unambiguous range estimate can always be determined.

The disclosed embodiments solve this problem using multiple measurements across several RF channels. Using two channels having frequencies $F_{RF1}$ and $F_{RF2}$, which are separated by a frequency difference of ΔF, a phase delay measurement can be performed for both of these channels and the difference between those two phase delay measurements calculated as:

$$\Delta\varphi_{roundtrip} = \varphi_{roundtrip1} - \varphi_{roundtrip2}$$ Equation 10

$$= \mod\left(\frac{2 * d * F_{RF1} * 2\pi}{c}, 4\pi\right)$$

$$- \mod\left(\frac{2 * d * F_{RF2} * 2\pi}{c}, 4\pi\right)$$

$$= \mod\left(\frac{2 * d * \Delta F * 2\pi}{c}, 4\pi\right)$$

The phase delay difference $\Delta\varphi_{roundtrip}$ is linear with distance, but the distance is no longer determined by the RF frequency but by the frequency separation of the two measurements. The closer the two frequencies are to each other, the longer the unambiguous range. This implies that by making the two measurements close enough, an unambiguous range that is longer than the range of the radio communication can be provided.

One complication is that the phase cannot be measured with infinite precision, providing a level of uncertainty to $\Delta\varphi_{roundtrip}$. When ΔF (e.g., the frequency difference or frequency separation) is small, this uncertainty provides a large uncertainty in the distance estimation. To work around this complication, additional measurements can be made with a larger ΔF. In one embodiment, the method starts out with a small frequency step, ΔF, to find a coarse estimate of the distance d. The frequency step can be gradually increased to increase the accuracy of the distance estimate. In one embodiment, the process is performed in a stepwise fashion, with any ambiguity being solved for as the process progresses. The supported unambiguous range is given by the smallest frequency step ΔF utilized, and the accuracy is determined by the largest ΔF utilized. Additionally, the solution is very scalable.

In some embodiments, an additional factor may need to be factored in, e.g., analog delay in the transmitter and receiver. In both the measured phase difference at electronic device A ($\varphi_{measured\_a}$) and the measured phase difference at electronic device B ($\varphi_{measured\_b}$) there will be an additional term for the phase delay due to analog delay, which is a constant for a device:

$$\varphi_{analog\_delay} = analog_{delay} * F_{RF} * 2\pi$$ Equation 11

With this additional term the phase delay estimate becomes:

$$\varphi_{roundtrip} = \varphi_{measured_a} + \varphi_{measured_b} =$$ Equation 12

$$\mod\left(\frac{2 * d * F_{RF_A} * 2\pi}{c} + 2 * analog\_delay * \Delta F * 2\pi, 2\pi\right)$$

Calculating the phase delay, $\Delta\varphi_{roundtrip}$, the expression becomes:

$$\Delta\varphi_{roundtrip} =$$ Equation 13

$$\mod\left(\frac{2 * d * \Delta F * 2\pi}{c} + 2 * analog_{delay} * \Delta F * 2\pi, 2\pi\right)$$

If the analog delay times ΔF is much smaller than 1, we can disregard the last term. If the analog delay multiplied by ΔF is larger, this factor can be taken into account by compensating for the added phase. In this case, the analog delay may be known a priori, and compensation can be provided based on the known analog delay. In one embodiment the analog delay for each of electronic device A and electronic device B is measured during production of the devices or during some initial calibration phase of the system.

Applicants have disclosed electronic devices and methods for providing wireless ranging. Embodiments of the disclosure can provide one or more of the following advantages:

Greater accuracy than RSSI based ranging, as the received signal strength can be very unreliable due to fading phenomena;

There is no need to have accurate time synchronization between electronic devices in the system, which relaxes the requirements on oscillators and sampling speeds;

There is no need for out-of-band synchronization of the devices; only the normal wireless TX/RX paths are required;

The use of multiple narrow bandwidth measurements instead of a single wide band measurement makes it easier to work in noisy/busy RF environments;

The use of multiple narrow bandwidth measurements also reduces the peak power consumption to make battery operation or other power limited applications feasible;

Precision and range can be scaled by selecting the spacing between the frequencies in use;

Uses common existing building blocks of RF devices and does not require complex hardware;

Low power since high speed sampling is not necessary;

At least some example embodiments are described herein with reference to block diagrams and/or flowchart illustrations of computer-implemented methods, and/or computer program products. These computer-implemented methods can be stored as computer program instructions in a non-transitory tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

In at least some additional or alternative implementations, the functions/acts described in the blocks may occur out of the order shown in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A first electronic device for providing wireless ranging, the first electronic device comprising:
    a processing unit;
    a software-controlled transceiver coupled to a connector for attachment to an antenna;
    a first controllable oscillator;
    a phase estimator;
    a memory, wherein the processing unit, the software-controlled transceiver, the first controllable oscillator, the phase estimator and the memory are coupled to each other; and
    instructions stored in the memory that, when executed by the processing unit, cause the first electronic device to:
        make a first distance measurement of a distance between the first electronic device and a second electronic device using a property from a group consisting of: Received-Signal-Strength-Indication (RSSI) and Time-of-Flight (TOF);
        determine a set of frequencies separated by a frequency step based on the first distance measurement;
        for each frequency in the set of frequencies:
            set the software-controlled transceiver to the respective frequency,
            send a first tone having the respective frequency to the second electronic device, wherein the first tone is configured to cause the second electronic device to set a frequency of a second controllable oscillator of the second electronic device based on the respective frequency of the first tone,
            receive from the second electronic device a second tone having the respective frequency,
            determine a first phase difference between the second tone and the first controllable oscillator,
            receive a second phase difference between the first tone and the second controllable oscillator from the second electronic device, and
            calculate a phase delay for the respective frequency based on the first phase difference and the second phase difference;
        calculate multiple phase delay differences for the set of frequencies based on the phase delays;
        determine candidate distance ranges associated with each of the phase delay differences; and
        determine a second distance measurement of the distance between the first electronic device and the second electronic device that overlaps at least one candidate distance range for each of the phase delay differences.

2. The first electronic device as recited in claim 1 wherein a tonal exchange, which comprises the sending of the first tone to the second electronic device and the receiving of the second tone, is repeated a number of times for each frequency in the set of frequencies.

3. The first electronic device as recited in claim 2 wherein the instructions to calculate the phase delay for each frequency in the set of frequencies comprise instructions that cause the first electronic device to average a set of phase delays corresponding to a set of tonal exchanges for each frequency in the set of frequencies.

4. The first electronic device as recited in claim 1 wherein the instructions to calculate the phase delay include instructions that cause the first electronic device to add the first phase difference and the second phase difference.

5. The first electronic device as recited in claim 1 wherein the instructions to determine the second distance measurement of the distance between the first electronic device and the second electronic device using the phase delay difference for the set of frequencies comprise instructions that cause the first electronic device to, for a first frequency in the set of frequencies that is separated from a second frequency in the set of frequencies by a first frequency difference $\Delta F1$, calculate a first estimated distance d1 using a formula, $$\Delta \varphi_1 = \mathrm{mod}\left(\frac{2 * d1 * \Delta F1 * 2\pi}{c}, 4\pi\right),$$

where $\Delta \varphi_1$ is a difference between the phase delay for the first frequency and the phase delay for the second frequency.

6. The first electronic device as recited in claim 5 wherein the instructions to determine the second distance measurement of the distance between the first electronic device and the second electronic device using the phase delay difference for the set of frequencies further comprise instructions that cause the first electronic device to, for a third frequency that is separated from the first frequency by a second frequency difference ΔF2, calculate a second estimated distance d2 using a formula, $$\Delta\varphi_2 = \mod\left(\frac{2*d2*\Delta F2*2\pi}{c}, 4\pi\right),$$

where $\Delta\varphi_2$ is a difference between the phase delay for the first frequency and a phase delay for the third frequency.

7. The first electronic device as recited in claim 6 wherein the instructions to determine the second distance measurement of the distance between the first electronic device and the second electronic device further comprise instructions that cause the first electronic device to utilize the second estimated distance to refine the first estimated distance.

8. The first electronic device as recited in claim 1 wherein during execution of the instructions, the first electronic device is capable of switching from transmitting a signal to receiving a signal or from receiving a signal to transmitting a signal without losing phase information.

9. The first electronic device as recited in claim 1 wherein the software-controlled transceiver is a low-power transceiver.

10. The first electronic device as recited in claim 1 wherein the first tone is sent as part of a synchronization sequence between the first and second electronic devices.

11. The first electronic device as recited in claim 1 further comprising instructions that cause the first electronic device to measure a frequency offset between the first electronic device and the second electronic device.

12. The first electronic device as recited in claim 1 wherein the frequency step is a first frequency step and the set of frequencies is a first set of frequencies, the instructions include further instructions that, when executed by the processing unit, cause the first electronic device to determine a second set of frequencies separated by a second frequency step based on the second distance measurement of the distance between the first electronic device and the second electronic device.

13. The first electronic device as recited in claim 12 wherein the second frequency step is greater than the first frequency step.

14. The first electronic device as recited in claim 12 wherein the second frequency step is determined based on providing higher accuracy than the first frequency step.

15. The first electronic device as recited in claim 1 wherein each of the first phase difference and the second phase difference includes an analog delay, and wherein the instructions to calculate the phase delay account for the analog delays of the first phase difference and the second phase difference.

16. The first electronic device as recited in claim 1 wherein the instructions cause the first electronic device to send the first tone using the antenna and to receive the second tone using the antenna.

17. A non-transitory computer readable medium having a sequence of program instructions which, when executed by a processing unit in a first electronic device comprising a first oscillator, a transceiver and a phase estimator, perform a method for providing distance measurements, the method comprising:

determining a first distance measurement of a distance between the first electronic device and a second electronic device based on at least one of: Received-Signal-Strength-Indication (RSSI) or Time-of-Flight (TOF);
determining a set of frequencies having a frequency step therebetween that is based on the first distance measurement;
for each frequency in the set of frequencies,
  setting the transceiver to the respective frequency,
  sending a first tone having the respective frequency to the second electronic device, wherein the first tone is configured to set a second oscillator of the second electronic device to a frequency based on the respective frequency of the first tone,
  receiving from the second electronic device a second tone having the respective frequency,
  measuring a first phase difference between the second tone and the first oscillator,
  receiving a second phase difference between the first tone and the second oscillator from the second electronic device, and
  calculating a phase delay for the respective frequency based on the first phase difference and the second phase difference;
calculating multiple phase delay differences for the set of frequencies;
determining candidate distance ranges associated with each of the phase delay differences;
determining a second distance measurement of the distance between the first electronic device and the second electronic device that overlaps at least one candidate distance range for each of the phase delay differences; and
refining the first distance measurement of the distance between the first electronic device and the second electronic device using the second distance measurement.

18. A first electronic device comprising:
a processing unit;
a first oscillator; and
a non-transitory memory storing instructions that, when executed by the processing unit, cause the first electronic device to:
  make a first measurement of a distance between the first electronic device and a second electronic device based on a property from a group consisting of: Received-Signal-Strength-Indication (RSSI) and Time-of-Flight (TOF);
  determine a set of frequencies separated by a frequency step for a second measurement of the distance based on the first measurement of the distance; and
  make the second measurement of the distance by:
    for each frequency in the set of frequencies:
      transmitting, to the second electronic device, a first communication that includes a first tone having the respective frequency;
      receiving, from the second electronic device, a second communication that includes a second tone having the respective frequency;
      determining a first phase difference between the second tone and the first oscillator;
      receiving, from the second electronic device, a second phase difference between the first tone and a second oscillator of the second electronic device; and determining a phase delay for the respective frequency based on the first phase difference and the second phase difference;

determining multiple phase delay differences for the set of frequencies based on the phase delays of the set of frequencies;

determining candidate distance ranges associated with each of the phase delay differences; and determining a value for the second measurement of the distance between the first electronic device and the second electronic device that overlaps at least one candidate distance range for each of the phase delay differences.

19. The first electronic device of claim 18, wherein the transmitting of the first communication, the receiving of the second communication, the determining of the first phase difference, the receiving of the second phase difference, and the determining of the phase delay is repeated a plurality of times for each frequency in the set of frequencies to produce a plurality of phase delays for the respective frequency.

20. The first electronic device of claim 19, wherein:

the instructions include further instructions that, when executed by the processing unit, cause the first electronic device to, for each frequency in the set of frequencies, average the plurality of phase delays for the respective frequency to produce an average phase delay for the respective frequency; and the determining of the multiple phase delay differences is based on the average phase delays of respective frequencies of the set of frequencies.

\* \* \* \* \*